United States Patent [19]

Leyde et al.

[11] 4,031,406

[45] June 21, 1977

[54] METHOD AND APPARATUS FOR CONTROLLING ELECTRICAL LOADS

[75] Inventors: Warren L. Leyde, Seattle; Delbert E. Marker, Issaquah, both of Wash.

[73] Assignee: Pacific Technology, Inc., Renton, Wash.

[22] Filed: June 16, 1975

[21] Appl. No.: 587,150

[52] U.S. Cl. .............................................. 307/41
[51] Int. Cl.² ...................................... H02J 13/00
[58] Field of Search .............. 307/41, 40, 38, 11, 307/35, 39; 235/151.21

[56] References Cited

UNITED STATES PATENTS

| | | | |
|---|---|---|---|
| 3,339,079 | 8/1967 | Kessler | 307/41 |
| 3,489,913 | 1/1970 | Wildi | 307/41 |
| 3,566,147 | 2/1971 | Masreliez | 307/39 |
| 3,714,453 | 1/1973 | Delisle et al. | 307/41 |
| 3,769,520 | 10/1973 | Carrington | 307/41 |
| 3,906,242 | 9/1975 | Stevenson | 307/38 |

Primary Examiner—Herman J. Hohauser
Attorney, Agent, or Firm—Christensen, O'Connor, Garrison & Havelka

[57] ABSTRACT

In an electrical load control system, method and apparatus are provided for selectively, individually connecting and disconnecting a plurality of loads to and from a power source. The loads are selectively connected (added), disconnected (shed), and reconnected (restored or added), in a predetermined sequence, wherein the ranking of the loads in such sequence is selectively rotated in a manner which results in a sharing of on and off time and an equalizing of wear among all of the loads. As an example of this operation, a load control system is disclosed in which the consumption of electrical power is varied by periodically shedding and adding individual loads in order to maintain the level of power usage below predetermined limits and yet make full use of the available power within such limits. For this purpose, a load regulating circuit monitors the power consumption and issues either an add command signal causing one or more loads to be connected, or issues shed command signal causing one or more of the loads to be disconnected, that is, shed. To uniformly distribute the off time associated with shed loads among all the loads, a load switching circuit means and a load rotation circuit means are provided for rotating the order in which the loads are shed, and thereafter restored or added. The rotation takes two forms. First, the order or rank in which the plurality of loads are shed, is shifted or rotated after each occurrence of a condition in which all of the loads have been turned on. Secondly, when less than all of the loads are on, the on-off ranking or status of the loads, resulting from the preceding add or shed command, is periodically shifted or rotated among all of the loads, in order to share the available electrical power on a timed rotation basis. Thus, the disruption of load service due to the curtailed power, is time shared among all of the loads on an equal, non-priority basis.

13 Claims, 4 Drawing Figures

METHOD AND APPARATUS FOR CONTROLLING ELECTRICAL LOADS

BACKGROUND OF THE INVENTION

The present invention relates to electrical load control systems in which a plurality of loads are selectively and recurringly connected to and disconnected from a power source in order to regulate the number of loads that are energized by such source in accordance with a predetermined regulation objective.

Electrical load regulation means are utilized in a wide variety of control systems where it is necessary or desirable to control the number of loads that are energized at any given time. A particular example of such regulation is found in systems for automatically, selectively deenergizing (shedding) electrical loads, in an installation including a predetermined plurality of loads, in order to reduce the rate of electrical energy consumption. The reduced consumption may be necessary in order to stay within predetermined consumption limits established by the utility company that supplies the power and/or by the utility customer. In an effort to increase the efficiency of electrical energy use by the utility customers, the utility industry typically charges users according to a formula based upon actual power consumption and the maximum energy demand, contracted for or set by the user, for each of a continuous succession of predetermined demand intervals, usually 15 or 30 minutes per interval. To reduce the expense associated with the maximum demand factor in the billing, it is a benefit to the customer to operate his plant to utilize up to or just below the maximum demand limit within each demand interval.

Various load regulation systems have been devised for automatically maintaining the customer's power consumption within the predetermined demand limit. Briefly, these systems operate to monitor the power consumption during the demand interval, continually comparing it with a predetermined reference rate of use, and automatically disconnecting (shedding) and reconnecting (adding or restoring) loads as required in order to maintain a predetermined relationship to the reference consumption rate. The reference rate, when projected to the end of the demand interval, maintains the customer within the maximum demand limit. Examples of such regulation systems are disclosed in U.S. Pat. Nos. 3,296,452 issued to Wallace L. Williams, Jan. 3, 1967, and 3,505,508 issued to W. L. Leyde on Apr. 7, 1970. In these systems, a predetermined group of loads, for example 10 loads, are initially all turned on at the commencement of each demand interval, and thereafter, if necessary, selectively shed in order to stay within the predetermined demand rate. Also, if less than all of the loads are energized, and the actual consumption drops significantly below the reference rate, then one or more of the previously shed loads is added or restored to the previously energized status.

Other load regulation systems in which a plurality of loads are selectively added and shed with respect to an energizing source include equipment which produces a regulatable output in response to the combined operations for a plurality of individual electrical load components. For example, a pumping system may provide an output flow regulated by turning on and off one or more of a plurality of pumps. Other examples are electrical furnaces having a plurality of individually energizable heating elements and in which the heating output of the furnace is to be regulated, and an air conditioning system having a plurality of individually controllable fans.

In the foregoing control systems, it is desirable to provide for distributing or sharing the on and off times independently demanded by the regulating means, among all of the predetermined plurality of electrical loads. For example, an industrial plant or commercial building may include a plurality of air conditioning or heating units distributed throughout the facility, where each unit constitutes one of a plurality of electrical loads subject to being intermittently shed by the load demand regulation means. In many installations, there is no particular ranking of relative importance of the units, such that each unit may be interrupted for brief periods of time without seriously disrupting the overall use or operations of the building. Nevertheless, available load control systems are provided with built-in load control priority schemes, which are either hard wired into the system, or manually selectable by switches, jumpers, or other manually effected controls. Accordingly, certain of the plurality of loads, such as the air conditioning units in the above example, will be designated as low priority units subject to frequent interruption of service. Although it is possible to manually change the priority scheme, this is impractical in that it requires the attention and time of an operator to monitor the system and periodically change the controls.

Another disadvantage of the functioning of existing demand controllers is the interruption of one or more low priority loads for undesirable long periods of time. This may occur in a control system in which the loads, when all connected, consume power close to or just slightly in excess of the allowable rate of consumption. Accordingly, after the commencement of each demand interval, one or more of the lower priority loads is turned off and remains off until the end of the interval so as not to exceed the maximum demand. Thus, a situation may result in which one or more of the loads, such as the air conditioning units in the above example, are out of service for a significant amount of the time.

In the case of control systems in which loads are selectively turned on and off at reoccurring times in order to regulate an output condition, as in the multiple pump example above, it is desirable to rotate or vary the sequence in which the loads are energized. Such rotation equalizes the wear among the various loads and results in a longer, trouble free life of the system. While certain methods and apparatus for sequentially energizing and/or alternating loads are available, they have not provided the reliability, long operating life and versatility that is desired in many applications.

SUMMARY OF THE INVENTION AND ITS OBJECTIVES

Accordingly, it is an object of the present invention to provide an improved method and apparatus for controlling the individual on-off conditions of a plurality of electrical loads within the constraints of an independent load regulating means determining the collective disposition of the loads, e.g., the number of loads on versus the number of loads off.

Another object of the present invention is to provide improved method and apparatus for controlling the individual on-off conditions of a plurality of electrical loads in response to a load demand monitoring and regulating system that commands the shedding (disconnecting) and/or adding (connecting) of loads in order to maintain the electrical power consumption within predetermined limits.

It is still a further object of the present invention to provide such a method and apparatus for use in conjunction with a load demand monitoring and regulating system, in which the plurality of loads are added and shed on a rotating, nonpriority basis so that the interruption in service is shared equally among the entire group of loads.

Additionally, it is an object of the present invention to provide method and apparatus responsive to a load regulating means for automatically rotating the order in which the individual loads are connected to and disconnected from a power source.

Another object of the present invention is to provide a method and apparatus responsive to an independent load regulating means for automatically rotating the existent on-off order of loads when less than all of the loads are on, and without changing the total or collective number of on loads (and correlatively, without changing the collective number of off loads).

An additional object of the present invention is to provide an improved, automatic load controller for selectively, individually controlling the on-off condition of a plurality of electrical loads in response to means for regulating the collective disposition of such loads, in which the controller has the characteristics of relatively low cost, long operating life, reliability and versatility.

Briefly, these objects are achieved by method and apparatus in combination with an electrical control system including a load regulating means for independently regulating the collective disposition of a plurality of electrical loads. The collective disposition refers to the on-off conditions of the loads taken as a whole, and is distinguished from the on-off conditions of the loads when considered individually. For example, in a predetermined group of ten loads, the regulating means may demand that the collective disposition of these loads be: eight loads on and two off, without determining which of the individual loads are to assume the on and off conditions. For this latter purpose, a load controller is provided, and includes a plurality of load control outputs, each having a load on condition and a load off condition and being adapted for controlling the on-off condition of an individual one of the plurality of loads.

These outputs are in turn controlled by a load switching means that is responsive to the regulating means and serves to switch the plurality of control outputs between the on and off conditions in accordance with a multiplicity of selective, rotatable switching states. These states are switched in a predetermined, closed loop sequence to establish an order or ranking according to which the loads are added to and shed from the power source in response to a particular demand from the regulating means.

A load rotation circuit means is connected to the load switching means and is responsive to a predetermined status of on-off conditions at the plurality of outputs, to rotate the states of the switching means in the above-mentioned sequence for changing the add/shed order of the loads. The result is to cause a sharing of the available electrical power as determined by the load regulating means and to equalize the off time among all of the loads.

In the embodiment of the invention disclosed herein, the rotation of the switching states is provided by means in the load switching circuit for sensing a predetermined status of the output conditions thereof. In one mode of operation, a status is sensed in which all of the loads are on. Thereafter, when the switching means responds to the first shed command to assume a set of states in accordance therewith, the switching means states are rotated in the above-mentioned sequence to a different set of states whereby the order in which the loads are shed and thereafter added or restored, is rotated.

In a second mode of operation, the invention provides for rotation of the order of existing on-off conditions among the plurality of outputs. This rotation occurs at timed intervals when less than all of the loads are on, by effecting an automatic, periodic rotation of the existing states of the switching means, without changing the established collective disposition of the loads, i.e., the number of loads on versus the number of those that are off among all of the predetermined plurality of loads.

The method and apparatus of the present invention as summarized above is useful in conjunction with means for regulating loads for maintaining power consumption within demand limits. Also, the present invention is useful for equalizing the wear on a plurality of electrical loads, by automatically rotating the sequence in which the loads are connected (added) and/or disconnected (shed), even though all of the loads are to be turned on and maintained on for an extended time, e.g., daily, by the independent regulating means. For example, it may be desirable to stage on and thereafter stage off, a plurality of load devices such as furnaces, air conditioners, water heaters, pumps, motors, etc. In such case, the rotation of the sequence in which the loads are added, serves to equalize the start up wear among the various load devices, thereby prolonging the overall life of the equipment.

In another application, the independent regulating means may serve to monitor and regulate a physical output condition that is dependent on the collective effects of a plurality of load devices. For example, the regulating means may serve to monitor the volumetric flow produced by a predetermined plurality of pumps, and automatically regulate that flow by shedding and/or adding pumps to change the collective state thereof in order to maintain a preestablished flow. In such case, it is desirable to equalize the operating wear among the plurality of pumps, so that certain pumps are not prematurely worn out. Similar applications exist for controlling a plurality of electrical heating elements in an electrical furnace or electrical water heater; and for controlling a plurality of fans in an air conditioning system.

In addition to the foregoing, the method and apparatus of the present invention include circuit means for varying the frequency at which existing on-off conditions of the load switching means are rotated by the load rotation circuit means as a function of the number of loads that are on. Also, circuit means is provided for operating the load switching means to switch its plurality of states at delayed or staged intervals in response to repetitive demands by the regulating means to add or shed loads. Furtherstill, circuit means is provided for generating add and shed command signals at an interface between the regulating means and the aforementioned load switching means and load rotation means.

DESCRIPTION OF THE PREFERRED EMBODIMENT

Figure 1:
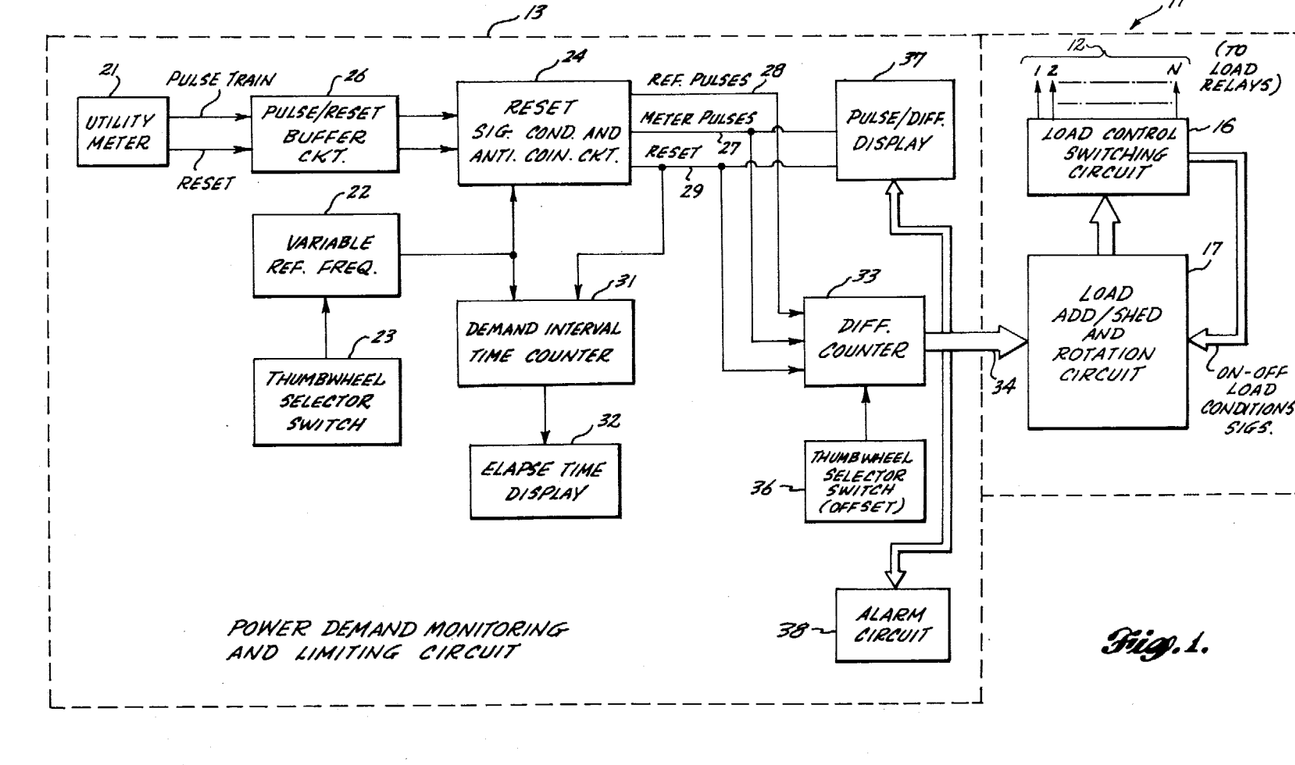
FIG. 1 is a generalized block diagram view of the load controller of the present invention in combination with a load regulating means in the form of a power demand monitoring and limiting circuit.

With reference to FIG. 1, the present invention provides a method and apparatus for use in an electrical control system in which a predetermined plurality of electrical loads are adapted to be turned on (added) and/or turned off (shed) in response to a load regulating means functioning to determine the collective on-off disposition of all of the loads, e.g., the number of loads on versus the number of loads off. In the presently disclosed embodiment, this method and apparatus are embodied in a load controller 11 having a plurality (N) of control outputs 12 adapted for selectively, individually controlling the connections of a plurality of electrical loads to a power source, in response to a regulating means, here in the form of a power demand monitoring and limiting circuit 13. As an example of the overall operation, circuit 13, functioning as the regulating means, dictates or governs the total number of loads, out of the predetermined plurality of loads, which are to be connected, that is turned on, by controller 11. The controller itself, selects, on an individual basis, which of the loads are to be turned on and which are to be turned off, in order to assume and thereafter maintain the collective disposition required by circuit 13. For example, circuit 13 may require an all on collective disposition of loads in which all of the loads are to be connected to the power source; or it may demand that less than all of the loads be turned on. In either case, controller 11 operates within the constraints established by circuit 13 to select a sufficient number of loads, among the plurality of loads available, for connection to the power source. Power demand monitoring and limiting circuit 13 may be provided by a number of well-known circuits available for regulating the number of on electrical loads by monitoring the demand consumption of electrical energy during each of a continuing succession of demand intervals and issue electrical commands to controller 11 for disconnecting (shedding) or connecting (adding or restoring) previously shed loads, in order to maintain the consumption within a predetermined maximum demand as discussed hereinabove.

Heretofore, power demand circuits, similar to circuit 13, have been employed to shed or add electrical loads on a preassigned priority schedule, which is either permanently wired into the control system or manually selected in accordance with the requirements of a particular installation. For the reasons discussed hereinabove, the priority switching of the loads is not always desirable, and in some cases leads to a disadvantageous restraint on the control of the loads.

In accordance with the present invention, controller 11 includes a load switching circuit 16 and a load add/shed and rotation circuit 17 coacting with circuit 13 for establishing and automatically rotating the order in which the loads are turned on and off. The automatic rotation of the switching orders provided by controller 11 permits certain advantageous modes of operation, including a nonpriority, time sharing of the reduced electrical service due to a curtailment of power consumption, i.e., the shedding of loads dictated by circuit 13.

More particularly, the load rotation provided by circuits 16 and 17 of controller 11 functions in two different, but cooperative modes. In a first mode, rotation circuit 17 serves to rotate the order in which the loads are shed, and thereafter added (restored) in response to the occurrence of a predetermined on-off status of the loads. More particularly, the shed/add order is rotated one position each time circuit 16 and the loads controlled by outputs 12 assume an "all on" status. In the case of a power demand control system, such as exemplified by circuit 13, this "all on" status or condition usually occurs at periodic times, namely at the commencement of each demand interval, and accordingly the shed/add sequence will be rotated at least once for each demand interval.

The second mode of rotation occurs in the present embodiment when less than all of the loads are on and switching circuit 16 has assumed a particular order of existing on and offconditions at outputs 12. For example, half of the plurality (N) of outputs 12 may be on and the other half off pursuant to a reduction in the power consumption by circuit 13. In this state, rotation circuit 17 provides for timed, automatic rotation of the on-off order previously assumed by circuit 16, whereby each rotation causes one of the on loads to be turned off, and a previously off load to be turned on. In other words, one of the previously disconnected loads is exchanged for a previously connected load, without changing the collective disposition at outputs 12 i.e., the net number of loads in the on condition.

Both of the foregoing modes of rotation cooperate to cause the loads to equally share the loss of service, of which otherwise would be born by certain individual loads. As indicated above, this nonpriority load rotation may be advantageously employed in certain facilities where the short term loss of service of individual ones of a plurality of loads will be less disruptive and less noticeable than longer and more frequent interruptions of particular ones of the plurality of loads. For example, the controller 11 may be used for an air conditioning system in which the plurality of loads constitute the individual air conditioning units that serve a commercial or industrial building. In this case, the rotation of brief periods of interruption of the individual units may be less disruptive than repeated, frequent loss of service in one particular area of the building.

In another application, the load rotation may be used with loads such as furnaces, which cannot be interrupted for more than a specified maximum time interval, e.g., 5 minutes. By rotating the off times among the loads, e.g., a plurality of furnaces, the continuous off time of each unit may be maintained under the specified limit.

While controller 11 is illustrated here in combination with a power demand monitoring and limiting circuit 13, the method and apparatus embodied by controller 11 may be utilized in combination with any regulating means, which, in general, provides for controlling the collective disposition of a predetermined plurality of loads in which the loads may be individually turned on and off within the constraints determined by the regulating means.

Power demand monitoring and limiting circuit 13, in this case, operates according to the ideal curve principle generally disclosed in the aforementioned U.S. Pat. No. 3,296,452. Briefly, the circuit functions to compare the actual rate of power consumption monitored by a utility meter 21 with an artificially generated reference consumption rate established by variable reference frequency generator 22 having a rate or frequency set by a manually controlled thumbwheel selector switch 23. The comparison is made during a preestablished time interval referred to as the demand interval. Utility meter 21 thus generates a train of electrical pulses representing the rate of actual power consumption and generates a periodic reset signal establishing the demand interval. These signals are connected to a reset signal conditioner and anticoincidence circuit 24 through a buffer circuit 26 to produce a sequence of meter pulses on output 27, representing the rate of power consumption, a series of reference pulses at output 28 representing the reference rate, and a reset signal at output 29 establishing the demand interval over which the comparison is made. A demand interval time counter 31 and an elapse time display 32 may be connected to circuit 24 and the reset output 29 thereof to provide a running display of the time that has elapsed during any given demand interval. The meter pulses, reference pulses and reset signal at outputs 27-29 are fed to a difference counter 33 which produces, in this embodiment, a digital difference count at output 34 representing a comparison between the actual rate of power consumption and the predetermined, desired or reference rate of comsumption in accordance with the ideal curve principle. Thus, with all of the loads turned on at the commencement of a demand interval, a decreasing difference count at output 34 indicates that the rate of actual consumption is overtaking the predetermined reference rate. In response thereto, controller 11 sheds one or more of the loads to curtail consumption of power such that at the end of the interval, the actual consumption falls at or below the maximum demand limit. At the commencement of each interval following a reset signal at output 29, counter 33 begins a new difference count, which typically will result in the addition or restoration of all of the previously shed loads. A thumbwheel selector switch 36 may be cooperatively associated with counter 33 to provide an initial offset or difference count at the commencement of each interval so that output 34 does not cause premature shedding of loads before a trend in the power consumption has developed. A pulse difference display 37 may be cooperatively connected to the output 34 of counter 33 for displaying the instantaneous difference count and an alarm circuit 38 is similarly connected to counter output 34 to signal an alarm or emergency condition in the event the difference count becomes zero or negative indicating that the demand limit is likely to be exceeded even though the loads have been or will be shed to reduce power consumption. Although an ideal curve type of power demand monitoring and limiting system is disclosed here, in the form of circuit 13 it will be appreciated that other types of power demand control systems may be employed in place of circuit 13 such as the ideal rate system which is similar to the ideal curve system disclosed here, except that no periodic reset signal is used and the difference counter develops a continuously running difference count in response to a continuously running reference pulse train and the usage pulse train; and the system based on the forecasting principle disclosed in the aforementioned U.S. Pat. No. 3,505,508 which does not have a difference counter per se, but produces discrete add/shed command signals for direct control of the loads.

CONSTRUCTION AND OPERATION OF CONTROLLER 11

Figure 2:
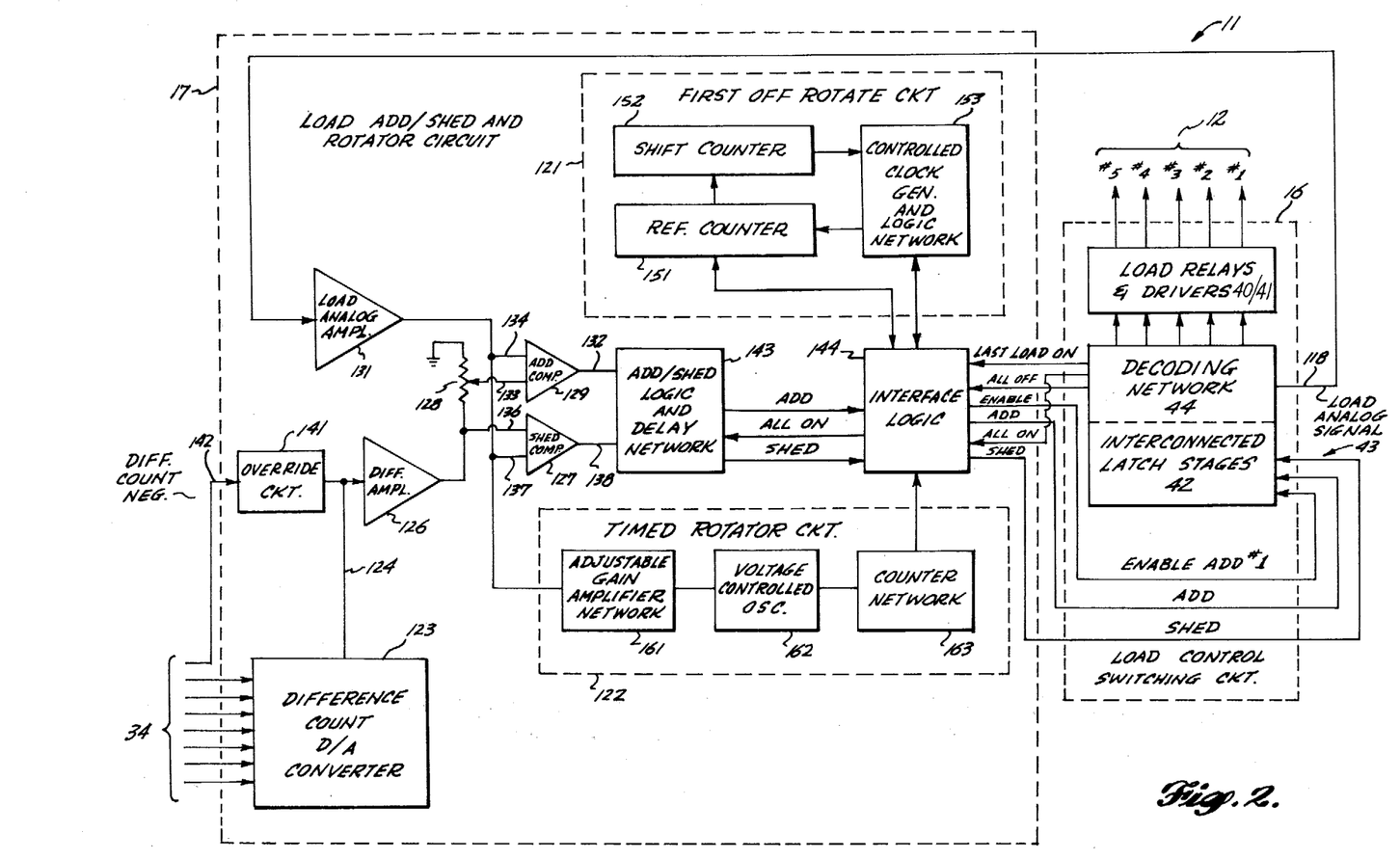
FIG. 2 is a more detailed block diagram of the controller of the present invention including a load rotation circuit and a load control switching circuit.
Figure 4:
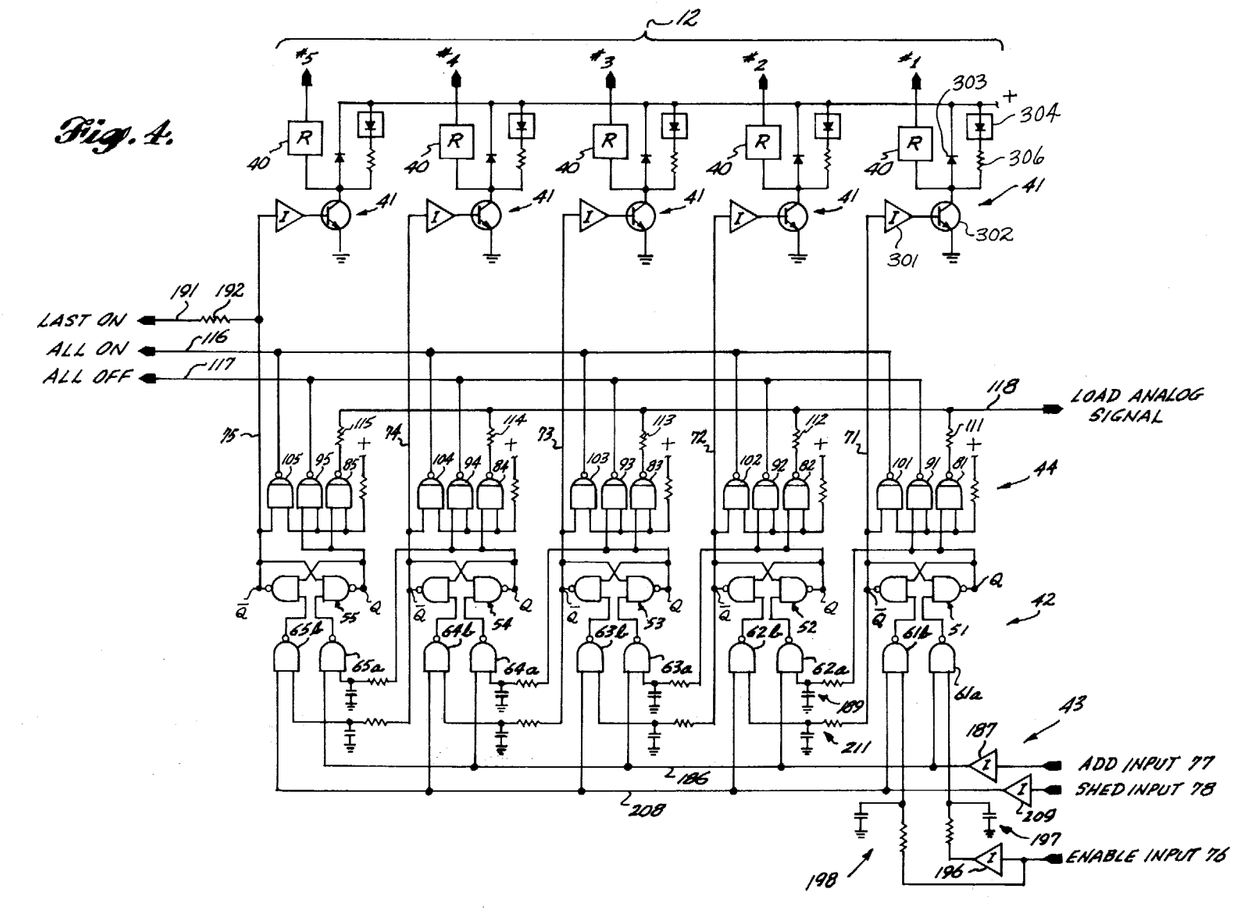
FIG. 4 is a detailed schematic diagram of the load control switching circuit of FIGS. 1 and 2.

With reference to FIGS. 2 and 4, the load control switching circuit 16 of controller 11 in this instance provides for controlling a plurality of five (N = 5) loads at outputs 12 numbered from right to left as outputs, Nos. 1, 2, 3, 4 and 5 for controlling correspondingly numbered loads. Of course, the number of loads constituting the plurality N may be any number selected to fulfill the requirements of a particular installation and the use of five loads here is for illustration purposes only. Moreover, the electrical loads are not shown in the drawings, as the type and number of such loads, and the means used to control the connection thereof to a power source will vary from installation to installation. Typically, electromagnetic relay devices 40 are utilized for connecting and disconnecting the load to the source, and the outputs 12, as shown in FIGS. 2 and 4, are the outputs of the contacts operated by relays 40 and are adapted to be connected to the loads for selective, individual operation thereof in accordance with the on-off condition at the associated output. For this purpose, a plurality of transistorized relay drivers 41 may be provided at each of the outputs as shown for driving an associated load relay in response to the on-off condition of load control switching circuit 16.

The plurality of relays 40 and drivers 41 are in turn individually controlled by the outputs of a plurality of bistable circuit stages or latch stages 42, each having complemental electrical outputs and being interconnected so that the switching state of each stage influences the response of another stage to control pulses applied at inputs 43 by load add/shed and rotation circuit 17. In this embodiment, stages 42 are provided by solid state latches 51, 52, 53, 54 and 55, each having complementary outputs Q and $\bar{Q}$. To switch each of the latches 51-55 between their bistable states, referred to herein as the set and reset states, a series of steering gates 61a and b, 62a and b, 63a and b, 64a and b and 65a and b are provided to steer control pulses applied at inputs 43 to and for switching the latches 51-55 according to the existent state of a preceding latch. A separate latch is provided for each of the predetermined plurality of loads and accordingly, in this instance, five latches are illustrated. The Q output of each latch is connected to an associated one of the relay drivers 41 over connecting lines 71, 72, 73, 74 and 75 for controlling the on-off condition of the relay driver and its associated load in accordance with he state, namely the set or reset state, of each latch. In this particular embodiment, the relay drivers and associated loads are turned on (connecting the associated load to the power source) when the associated latch 51-55 is switched to a set state. In the set state the $\bar{Q}$ output assumes a logic low level that is extended over lines 71-75 for turning the associated transistor driver on while concurrently the complemental output Q assumes a high logic level.

The complementary outputs of each latch are interconnected with the steering gates of another latch to form a chain of interconnected latch stages, here commencing with a first latch 51 and continuing through latches 52, 53, 54 and 55. The interconnected chain is completed by a separate logic circuit which, in this instance, is located in the load add/shed and rotator circuit 17 shown in FIG. 3 that couples the complementary outputs of the last latch 55 to and for controlling the steering gates 61a and b associated with the first latch 51 via an enabling input 76 of control inputs 43.

As more fully explained herein, this interconnection of flip-flop or latch stages provides a plurality of rotatable switching states that determine the on-off conditions at outputs 12, and which can be rotated in a predetermined closed loop sequence to rotate the order in which the loads are responsive to the regulating means of circuit 13.

As indicated above, the switching states of latches 51-55 are rotated in two different but related modes. First, the states of stages 42 may be rotated to change the order in which loads Nos. 1 through 5 are shed and subsequently added (restored). Secondly, an existing set of on-off conditions at outputs Nos. 1 through 5 may be rotated or shifted to switch one of the previously off outputs to an on condition, and correlatively, to switch one previously on outputs to an off condition whereby the available electrical power is shared on a time rotation basis with all of the loads.

For this purpose, inputs 43 to latch stages 42 include an add input 77 providing a means responsive to an add pulse signal to selectively switch one of stages 51 through 55 from a reset state to the set state for adding or switching additional ones of outputs 12 to the on condition. Another input 78 provides means responsive to a shed pulse signal for selectively switching one of the latches 51 through 55 back to the reset state for switching one of outputs 12 from the on condition to the off condition and thereby shedding or disconnecting a corresponding load. The enable input 76 as indicated above serves as a means to complete the ring of interconnected states 42 through logic circuitry provided in rotator circuit 17 and described more fully herein, thereby establishing the closed loop sequence in which the states of latches 51-55 are rotated.

In addition to the individual application of add and shed pulse signals to inputs 77 and 78, stages 42 are responsive to the simultaneous application of add and shed pulses at these inputs to provide a means to rotate the states of stages 42 by advancing or shifting the logic states exhibited by latches 51 through 55 one position, where the shifting takes place, in this instance, from right to left with the logic state of the last latch 55 being brought around and assumed by the first latch 51.

This rotation of the switching states provided by stages 42 occurs in response to a predetermined status of the on-off conditions at outputs 12. Here the status of the outputs is sensed by a decoding network 44 including a plurality of gates 81-85, gates 91-95 and gates 101-105, and resistors 111-115 coupled to the Q and $\bar{Q}$ outputs of latches 51-55. An input of each of these gates is connected to a supply voltage through a current limiting resistor, whereas the remaining input of each gate is selectively enabled by the latch outputs. The status of the loads associated with outputs 12 is detected by decoding network 44 through the combined logic states of latches 51 through 55 as translated through the aforementioned gates and resistors. This decoded signal information if fed to circuit 17 for causing circuit 17 to rotate the switching order of stages 42 at predetermined times. In this embodiment, the decoded signal information is provided in the following manner. First, a logic signal is fed to circuit 17 over interconnecting line 116 associated with the outputs of gates 101-105 representing an all on status of the loads at outputs 12. A similar logic signal representing an all off status of the loads, derived from the combined outputs of gates 91 through 95, is forwarded to circuit 17 over interconnecting line 117. Additionally, an analog signal representing the ratio or proportion of the number of loads on versus the number of loads off is fed to circuit 17 over interconnecting line 118. This is referred to as the analog load signal and is here derived by a type of digital-to-analog converter formed by resistors 111 through 115 associated with the outputs of gates 81 through 85 of decoding network 44.

Figure 3:
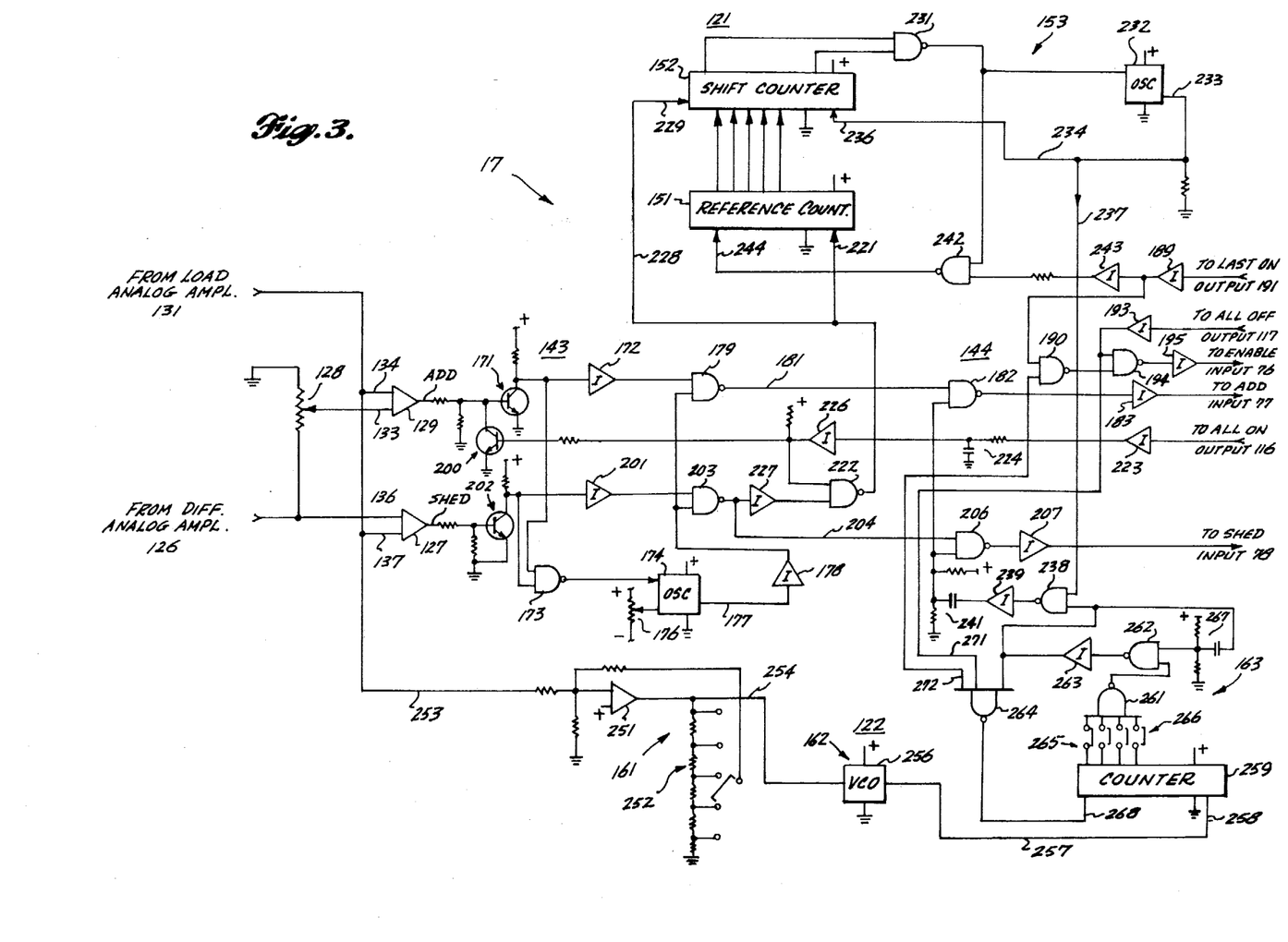
FIG. 3 is a detailed composite schematic and block diagram of the load rotation circuit of FIGS. 1 and 2.

With reference to FIGS. 2 and 3, load add/shed and rotation circuit 17 is responsive to the load status signals developed by decoding network 44 to intermittently rotate the switching states of latch stages 42. For this purpose, the present embodiment includes a first off rotator circuit 121 and a timed rotator circuit 122. Circuit 121 in this embodiment provides for rotating or shifting the starting order in which the plurality of loads under the control of outputs 12 are shed, and thereafter added, in response to the load regulation of circuit 13. Timed rotator circuit 122 functions to periodically rotate or shift the on-off conditions exhibited by the loads at outputs 12 during periods when less than all of the loads are on.

In addition to these rotation functions, circuit 17 develops suitable add/shed pulse control signals for operating latch stages 42 to add to or shed from the net or collective number of on loads at outputs 12 in response to the difference count developed by counter 33 of circuit 13. Accordingly, with reference to FIG. 2, output 34 in the form of a plurality of parallel bit lines is connected to a digital-to-analog converter 123 to produce an analog signal on output line 124 representing the instantaneous magnitude of the difference count. This signal on line 124 will vary throughout the demand interval as the relationship between the actual power consumption and the ideal curve consumption changes. The difference count analog signal is fed through an amplifier 126 and applied first directly to one input of a first comparator 127 and indirectly through an attenuating potentiometer 128 to an input of a second comparator 129.

The remaining inputs of comparators 127 and 129 are connected to receive the load analog signal developed by decoding network 44 after suitable amplification by an amplifier 131. This pair of comparators serves to generate the add and shed signals by comparing a signal representing the magnitude of the difference count established by circuit 13 and a signal representing the proportion of loads that are in the on condition.

More specifically, comparator 129 generates an add signal at output 132 whenever the difference count after attenuation by potentiometer 128 increases above a variable threshold level established by the load analog signal at input 134. For example, with less than all of the loads energized and with an increasing difference count the difference count analog signal applied at input 133 of comparator 129 may exceed the threshold analog level at input 134 representing the proportion of loads on, thereby causing output 132 of the comparator to produce an add signal in the form of a change in the output logic level.

Similarly, shed comparator 127 responds to a decrease in the difference count below the threshold established by the load analog signal to produce a shed command signal.

In case the difference count registered by counter 33 of circuit 13 assumes a negative count, it is desirable to maintain the comparators in a shed command mode and for this purpose an override circuit 141 is provided. Circuit 141 is responsive to a negative count signal at input 142 from output 34 of difference counter 33 for generating an override signal at the input of amplifier 126 representing a zero difference count, for conditioning the comparators to develop a shed command.

The add and shed output signals from the comparators are processed through a logic and delay network 143 which provides for delaying or staging changes involving more than one load at a time to avoid undesirable power surges due to an abrupt connection or disconnection of a plurality of loads.

Interface logic 144 provides for various routing and interfacing between networks 143, circuits 121 and 122, decoding network 44 and latch stages 42.

The selectable attenuation provided by potentiometer 128 at the output of amplifier 126 serves to establish a dead band between the responses of shed and add comparators 127 and 129. This dead band prevents undesired oscillation of the circuit about a threshold add/shed point and results in a stable operation in response to a continuously varying difference count.

The threshold reference voltage at inputs 134 and 137 of comparators 129 and 127 changes in proportion to the number or ratio of loads on versus loads off. Thus, each time a net change occurs in the collective disposition of the loads under the control of outputs 12, a revised threshold comparison level is presented at inputs 134 and 137 with respect to which the analog difference count signals are compared. In this manner, a succession of add or shed signals may be generated as the difference count steadily increases or decreases and successively crosses the changing threshold levels presented by the load analog signal.

First off rotator circuit 121 as indicated above, provides in this embodiment for rotating the states of latch stages 42 in response to a shed command following each successive all on load status. For this purpose, circuit 121 includes a reference counter 151, a shift counter 152 and a controlled clock generator and logic network 153. These components cooperate with interface logic 144 to provide a means for generating an appropriate number of pulses for application to latch stages 42 at inputs 43 for rotating the switching states thereof by a number of positions determined by the number of previous, all on states assumed by outputs 12. More particularly, the number of such all on states is accumulated in reference counter 151 in response to each all on state, sensed by decoding network 44, as more fully described herein.

In this particular embodiment, the rotation of the electrical states exhibited by stages 42 in response to circuit 121 is accomplished by generating a predetermined number of pairs of simultaneous add and shed pulse signals at inputs 43, wherein each pair serves as a rotation signal and wherein the number of such pairs is determined by the count accumulated by reference counter 151. The pairs of simultaneous add and shed pulse signals are generated after the initial shed command signal appears at the output of shed comparator 138 following a status at outputs 12 in which all of the outputs are in the on condition, corresponding to an all on state of the loads. The construction and operation of circuit 121 in conjunction with the associated circuitry are more fully described herein in connection with FIGS. 3 and 4.

Timed rotator circuit 122 as shown in FIG. 2 includes an adjustable gain amplifier network 161, a voltage controlled oscillator 162 and a counter network 163, which together cooperate to rotate the on-off order of the loads controlled by outputs 12 at timed intervals and during periods in which less than all of the loads are on. In other words, the timed rotator circuit 122 is responsive to the predetermined status of the outputs 12, in which less than all, but at least one, of the outputs are in the on condition.

Briefly, this is achieved by the components of circuits 122 cooperating to provide means for generating simultaneous pairs of add and shed pulse signals, serving as rotation signals, for application at inputs 43 to shift or rotate the states of stages 42 without changing the collective or net number of stages in the set and reset states. The simultaneous pairs of add and shed pulse signals that serve to effect this rotation are produced at timed intervals, wherein the duration of the intervals is automatically varied as a function of the ratio of loads on to loads off. The frequency of the rotation intervals established by circuit 122 is increased as the number of loads that are on decreases. Thus, an inverse relationship exists between the rotation frequency provided by circuit 122 and the number of loads that have been turned on by outputs 12.

The purpose for this is to more effectively equalize the allocation of off time among the entire plurality of N loads as the available electrical power decreases. The sequence of operations and further details concerning the construction of the circuitry generally shown in FIGS. 1 and 2 is more fully explained by considering the operation of the circuits shown in FIGS. 3 and 4 in response to certain typical operating conditions. As a first example, it will be assumed that the entire plurality of loads controlled by outputs 12 are in an off condition, and circuits 16 and 17 of controller 11 are prepared for adding loads in response to power demand monitoring and limiting circuit 13.

ADDING LOADS

Typically, the commencement of a demand interval will result in an operation of circuits 16 and 17 by which all of the loads controlled by outputs 12 will be turned on. More particularly, the difference counter 33 of circuit 13 may assume a relatively large difference count at the beginning of the demand interval, which results in a correspondingly relatively large analog difference signal at input 133 of comparator 129 of circuit 17 as shown in FIG. 3. If this difference count analog exceeds the analog load voltage applied as a reference signal at input 134, comparator 129 will change its logic level at the output thereof signifying that additional loads are to be added. In order to separate or stage the addition of a number of loads at outputs 12, the changed logic signal at the comparator output is converted to a succession of add pulses by network 143.

For this purpose the output of comparator 129 is connected through a transistor buffer circuit 171 to an inverter 172 and to one input of a NAND gate 173. The output of NAND gate 173 controls an oscillator 174 including suitable means for adjusting the output frequency thereof, here provided by a potentiometer 176. Thus, in response to a change in the output of comparator 129, more specifically in this embodiment, a high going logic signal, oscillator 174, at its output 177, issues a succession of time separated pulses which are applied through an inverter 178 to one input of a NAND gate 179. The other input of gate 179 is controlled by the output of comparator 129 through inverter 172. Accordingly, a succession of add pulses are produced at the output of gate 179 and are forwarded over interconnecting line 181, through NAND gate 182 and through an inverter 183 of interface logic 144. Output 183 is applied to the add input 77 of inputs 43 associated with latch stages 42.

Accordingly, add input 77 receives a succession of add pulses, in this instance low going pulses of relatively short pulse width and being time spaced by the operation of oscillator 174. The width of the pulses and the time separation therebetween are not believed to be critical, however, by way of example the pulse width may be on the order of 1.5 microseconds and the separation between adjacent pulses may be on the order of 1–10 seconds. The number of pulses produced at input 77 is determined by the duration of the add logic state at the output of comparator 129. So long as the comparator remains in the add logic condition, there will be a continuing succession of add pulses applied to switching circuits 16 until all of the loads have been turned on. This is the expected operation at the commencement of each demand interval.

Referring to the switching operation of latch stages 42 of circuit 16, the succession of add pulses at input 77 is applied to an add bus line 189 through an inverter 187. The add bus line 186 is jointly connected to one of the inputs of each of add steering gates 61a–65a for switching an associated one of latches 51 through 55 to the set state. To enable this switching operation, the remaining input of gates 61a through 65a must be enabled or armed. For gates 62a through 65a, the enabling signal is derived from the Q outputs of a preceeding one of latches 51 through 54, respectively. A resistive capacitive (R-C) delay network is provided in series with the connection between each Q output of a latch and the control input of a succeeding one of gates 62a through 65a, as indicated by RC network 189 connected between the Q output of latch 51 and an input of steering gate 62a associated with latch 52. Network 189 delays a change in the enabling signal applied at the steering gate input in order to steer add pulses according to state of the latch existing prior to the appearance of new add pulse. The amount of delay is not believed critical, however, by way of example, 20 microseconds of delay has been found satisfactory.

In order to enable the steering gate 61a associated with the first latch stage, namely 51, an enable signal is derived from either the all off signal at output 117 or a signal provided at output 191 connected to the $\bar{Q}$ output of latch 55 through resistor 192 representing a condition in which the last load, namely load No. 5, is on. Outputs 117 and 191 are processed in interface logic 144 of circuit 17, and more particularly by inverter 189, NAND gate 190, inverter 193, NAND gate 194 and inverter 195 to develop an enable signal for application to input 76 under predetermined circumstances for enabling the switching of latch 51.

The first of these circumstances is the condition of stages 42 in which all of the loads are off, and latch 51 is to be switched to the set state in response to the first add pulse received at input 77. The second situation provides for enabling the first stage latch 51 in response to a condition in which the last stage latch 55 is on, to complete the ring of interconnected stages, i.e., the sequence is closed by coupling the last stage 55 to the first stage 51 through logic 144 of circuit 17 and input 76 of circuit 16.

The enable signal at input 76 is applied to gate 61a through an inverter 196 and a resistive capacitive (R-C) delay network 197, and to gate 61b throgh an R-C delay network 198.

In this particular embodiment the steering gates 61a–65a and 61b–65b are enabled for passing the associated add and shed signals to the respective latches by applying a highlogic level signal to the control input. Thus, steering gate 61a is enabled by a low-going or low level logic signal at input 76, which is changed in polarity by inverter 196 and applied through the delay network 197 as a high level signal to gate 61a enabling or arming the gate to respond to the first add pulse at input 77.

Succeeding latches 52 through 55 are similarly switched from a reset to a set state by enabling steering gates 62a through 65a from a Q output of a preceeding latch. For this purpose, the $\bar{Q}$ output of each latch assumes a relatively low logic level when the latch is in the set condition and the complementary output Q accordingly, goes to a high logic level in the set condition, thus enabling the succeeding add steering gate.

Accordingly, a relatively large difference count causes circuit 17 to produce a succession of add pulses at input 77 which successively turn on the loads controlled by outputs 12 at staged intervals determined by the timed intervals set by oscillator 174.

When an all loads on status occurs, further add pulses are inhibited by a transistor clamp 22 connected to the output of comparator 129 and responsive to all on output 116 of circuit 16.

SHEDDING LOADS

Assuming that all of the loads have now been turned on, difference counter 33 of circuit 13 continuously monitors the relationship between the actual power consumption and the desired or ideal curve reference. Typically, it will be necessary to shed one or more of the loads in order to maintain the consumption within the preestablished demand limit. This occurs when the difference count on counter 33 drops the analog difference voltage at input 136 of circuit 17 of FIG. 3 below the analog load voltage applied at input 137 of shed comparator 127. When this occurs, a shed signal is produced in which the logic level at the comparator output switches states, in this instance going from a low logic level to a high logic level. This shed command signal is fed to the remaining input of NAND gate 173 and to an inverter 201 through a transistor buffer circuit 202. NAND gate 173, oscillator 174, inverter 178 cooperate with inverter 201 and the output of shed comparator 127 in the same manner as described above in connection with the output of add comparator 129 and inverter 172, to produce a succession of shed signals at an output of NAND gate 203. The shed signals are spaced or staged by timed intervals determined by oscillator 174, and continue so long as the output of comparator 127 remains in a shed command state. These shed signals are fed over a connecting line 204, through a NAND gate 206 and an inverter 207 to shed input 78 of inputs 43 in circuit 16.

One or more of these shed pulses are applied to a shed bus line 208 of circuit 16 through an inverter 209 extending from shed input 78 with line 208 being jointly connected to one of the inputs of each of shed steering gates 61b through 65b. The remaining inputs of gates 61b through 65b are controlled by the $\bar{Q}$ output of one of latches 51 through 55 through an RC delay network, similar to network 189, such as delay network 211 connecting the $\bar{Q}$ output of latch 51 with the shed steering gate 62b associated with latch 52.

Steering gate 61b associated with the first stage latch 51 is controlled by the enable input 76, again completing the interconnection of the latch stages between the last latch 55 and the first latch 51.

With all of the latches in the set state, corresponding to an all load on condition, steering gate 61b is enabled for responding to the first shed pulse by a high logic level enable signal applied at input 76 from interface logic 144 of circuit 17. This results in latch 51 being switched back to the reset state, turning off the number one load and enabling the latch steering gate 62b associated with the succeeding latch stage to respond to the second shed pulse. When this occurs, latch 52 is switched from the set to the reset condition turning off the No. 2 load and enabling the steering gate associated with latch 53. Succeeding shed pulses cause the latches to be reset in the order in which the outputs are interconnected with the steering gates of a succeeding latch stage. Thus, loads are added and shed in a first on, first off sequence in response to the output of comparators 127 and 129.

ALTERNATELY ADDING AND SHEDDING LOADS

During a demand interval, not all of the loads are likely to be shed, and at least a portion of the loads will remain on. For example, assume that in the operation of circuits 16 and 17, two of the loads have been shed in response to first and second shed pulses received at input 78. This operation has disposed latches 51 and 52 in their reset state, while latches 53 through 55 remain set. Now assume that the relationship between the actual power consumption and the desired ideal curve consumption is such that the difference counter 33 begins to develop an increasing difference count. If the count increases sufficiently, circuit 17 will responsively operate to add an additional load. The generation of an add pulse at input 77 takes place in essentially the same manner as described above in connection with the commencement of the demand interval. When the add pulse appears at input 77, only the first and second latch stages are available for switching inasmuch as the last three stages are already in the set condition. Since the last stage corresponding to latch 55 is on, this results in an enabling signal at input 76 in the manner above described, conditioning steering gate 61a to respond to the add pulse, switching latch 51 to the set state, and switching the first or No. 1 output to the on condition.

If the difference count now reverses itself, and a shed pulse is produced at input 78, then the third stage latch 53, by the enabling of gate 63b by latch 54, will be switched back to the reset condition, burning off the No. 3 load. Since the No. 3 load was the first to be turned on (among loads Nos. 1, 3, 4 and 5), it is now the first to be shed.

It will be observed in this regard that the interconnected stages 42 establish an order in which the loads are added and shed in a first on, first off basis in response to the regulating effect of the circuit 13.

ROTATION OF SWITCHING ORDER

The first off rotator circuit 121 and the timed rotator circuit 122 of rotation circuit 17 function to rotate the latch states of switching circuit 16. Considering the operation of first off rotator circuit 121, this circuit provides a means for rotating the first load to be turned off in response to and following each period in which all of the loads have been on.

Assume that the first demand interval has elapsed, and that all of the loads have been turned on at the beginning of the second demand interval. With reference to FIG. 3, circuit 121 includes a reference counter 151 having a pulse counting input 221 connected to the output of a NAND gate 22 operating in response to a coincidence of all loads being on and comparator 127 being switched to a shed state. More particularly, gate 222 is responsive at one input thereof to an all on signal from output 116 of decoder network 44 of circuit 16 through an inverter 223, an RC delay network 224 and another inverter 226. In this particular embodiment, output 116 assumes a logic high level when all of the loads are on, which is inverted in polarity twice by inverters 223 and 226 to apply a logic high signal to one of the inputs of gate 222 enabling or arming the gate to respond to a high going signal at the outer input which is connected through an inverter 227 to the shed pulse output from gate 203.

Accordingly, in response to the first shed pulse occurring during an all on status, gate 222 issues a pulse signal to input 221 of the reference counter which registers the pulse by advancing its counting state.

Concurrently, the output pulse from gate 222 is fed over connecting line 228 to a control input 229 of shift counter 152 causing the counting state registered in reference counter 151 to be dumped into shift counter 152. In this particular instance, reference counter 151 has advanced only one state and therefore shift counter contains a count of one.

A NAND gate 231 having inputs connected to the shaft counter 152 decodes the fact that the shift counter is in a state other than zero and in response thereto actuates an oscillator means, here in the form of an oscillator 232 of network 153. The oscillator 232 begins to run, generating a train of pulses at output 233 at a predetermined frequency. This frequency is not critical, however by way of example, an oscillator having a 2.5KHz frequency output has been found suitable. This pulse train is connected over line 234 to a countdown input 236 of shift counter 152. Counter 152 begins to count down from the count level previously received from reference counter 151, which in the present example is a count of only 1. When the shift counter 152 reaches its zero count state, NAND gate 231 responsively deactivates oscillator 232 terminating the train of pulses. Thus in this particular example, a single pulse will be produced by the oscillator and it will be thereafter deactivated by gate 231 as the shift counter reaches the zero counting level. This pulse output from oscillator 232 is also fed over connecting line 237 to and for applying simultaneous add and shed pulses to add input 77 and shed input 78 of inputs 43 associated with latch stages 42. More particularly, the pulse output on line 237 is connected through a NAND gate 238, an inverter 239, an RC differentiator network 241, jointly to one input of add and shed gates 182 and 206. The outputs of these gates apply the oscillator pulse or pulses to the add and shed inputs of the switching circuit 16 as pairs of simultaneous add/shed pulses for rotating the states of latch stages 42.

With reference to FIG. 4, the simultaneous add and shed pulses are delayed with respect to the previously issued shed pulse, which precipitated the operation of circuit 121, and thus at inputs 43, the pulse signals are received in the following sequence. First, the shed signal generated by shed comparator 127 is applied to shed input 78 switching the first stage latch 51 to the reset state. Shortly thereafter, the simultaneous add and shed pulses generated by the first off rotator circuit 121 via line 237, gate 238, inverter 239 and differentiator network 241 are applied to inputs 77 and 78. Since the first stage latch 51 is reset and the second stage latch 52 is set, the add pulse at input 77 switches latch 51 back to the set state and the shed pulse resets the second stage latch 52, inasmuch as its steering gate 62b had been enabled by the previously reset state of latch 51. Delay network 221 allows the steering gate 62b to continue to be enabled by the previous reset output of latch 51 even though latch 51 is now in the set state, in order to permit latch 52 to respond to the shed pulse on line 208.

The entire switching sequence starting with the initial shed pulse and terminating with the simultaneous add and shed pulse signals occurs in a relatively short time interval, such as micro or milliseconds, substantially below the response time required for the relay devices 40 at outputs 12 to respond to the cycling of the states of the latches. Accordingly, the first stage latch 51 is rapidly switched from the set to the reset and back to the set condition before the load relay associated therewith can respond.

The result of this operation is to rotate the order in which the loads are shed. In the foregoing example, the sequence has been rotated such that the No. 2 load is now the first to be shed rather than the No. 1 load. After the No. 2 load has been shed, further shedding of loads will occur in the following order: No. 3 load, No. 4 load, No. 5 load and No. 1 load. Correlatively, the order of load addition has also been rotated.

In response to and following the next all on status, the reference counter, and as a consequence the shift counter, will be advanced to a state resulting in a pulse train consisting of two pulses at the output of oscillator 232. This in turn will generate a first pair of simultaneous add and shed pulses and a second pair of simultaneous add and shed pulses which will shift the switching order of latch stages 42 to shed the No. 3 load first. Accordingly, the sequence of shedding and adding loads has again been rotated.

This rotation following each all on status continues until the first load to be shed is the last load, in this example the No. 5 load. In response thereto, a NAND gate 242 operates to clear the reference counter. In particular, gate 242 has one of its inputs connected to the output of gate 231 and is responsive to the shift counter being in a nonzero state, and has the other input connected to respond to the last load on output 191 through inverter 189 and another inverter 243 to apply a signal to a clear input 244 of reference counter 151 in response to the coincidence of shift counter 152 being in a nonzero counting state and the last load being shed first. Here the last load on output 191 assumes a logic low level anytime the last load, here load No. 5, is on and switches to a high logic level when this load goes off. Clearing of reference counter 151 restores the first off rotator circuit 121 to its original state for beginning another cycle of rotation.

TIMED ROTATION

Timed rotator circuit 122 provides signal timing means for periodically rotating the on-off conditions of the loads controlled at outputs 12 during a status in which less than all of the loads are on. This timed rotation occurs independently of the net addition or shedding of loads, and thus serves to shift or exchange off loads for on loads without changing the net or collective number of loads that are on.

Moreover, the timing means of the circuit provides variable frequency means for changing the frequency of this rotation as a function of the ratio or proportion of the number of loads on versus number of loads off. In this embodiment, and preferably, the frequency change occurs in inverse relationship to the number of loads on. That is, with a decreasing number of loads on, the frequency of the timed rotation increases to more effectively equalize or share the available electrical power among all of the loads.

The rotation of the switching order by circuit 122 is achieved in a manner similar to the rotation produced by circuit 121 as described above, in that simultaneous add and shed pulse signals are generated and applied to interconnected latch stages 42 to shift or rotate the switching states thereof.

An adjustable gain amplifier network 161 including an amplifier 251 and an adjustable gain control network 252 is connected to receive the load analog signal at output 118 from decoding network 44 of circuit 16 over a connecting line 253 as shown in FIG. 3. Thus network 161 provides at an output 254 thereof, a control voltage which is proportional to the load analog signal representing the number of loads on, and has a selective gain determined by network 252.

The voltage at output 254 is connected to and for controlling the frequency of a voltage controlled oscillator 161 which is here provided by a voltage controlled oscillator 256.

The output of the oscillator 256 is connected over line 257 to a clock input 258 of a counter 259 forming part of counting network 163. The counting network which is operative when at least one, but less than all, of the loads are on, provides for generating simultaneous pairs of add and shed pulses at NAND gates 182 and 206 for rotating the latch stages 42 of switching circuit 16 in a manner similar to the operation of circuit 121.

More particularly, network 163 includes in addition to counted 259, a multi-input NAND gate 261 having an output connected to one input of another NAND gate 262 which in turn has an output connected through an inverter 263 jointly to an input of NAND gate 264 and to an input of NAND gate 238.

The inputs of gate 261 are adapted for connection to selected outputs 265 of counter 259, which in this instance is provided by a binary counter, such that gate 261 is responsive to counter 259 advancing to a predetermined counting state in response to the clock signals developed by oscillator 256. Inasmuch as counter 259 is in this embodiment a binary counter, the frequency of the output signal developed by gate 261 in response to the accumulation of clock pulses by the counter may be increased with each additional one of jumpers 266. In this embodiment, when the counter reaches the selected level determined by the placement of the jumpers 266, the output of gate 261 switches to a low logic level causing the output of gate 262 to go high and the output of inverter 263 to go low. This low going signal is applied to an input of gate 238 and is also fed back through an RC differentiator network 267 serving as a pulse stretcher, to the other input of gate 262. This arrangement produces a pulse signal in response to the counter output wherein the width of the pulse is determined by network 267. For example, a 6 microsecond pulse width is developed in this particular embodiment. This pulse signal is fed through inverter 263 to an input of gate 264 for clearing counter 259 at a control input 268 thereof.

At the same time, the pulse output of inverter 263 is processed by gate 238, inverter 239 and differentiator network 241 to produce a pulse signal suitable for use as the add and shed pulses. From network 241, the pulse signal is applied jointly to gates 182 and 206 to produce the pair of simultaneous add and shed pulses for rotating or shifting the states of latch stages of 42 of circuit 16 in the manner described above in connection with the operation of rotator circuit 121.

The timed rotation provided by circuit 122 is disabled or deactivated when the load control outputs 12 are either all on or all off. More particularly, gate 264 has an input 271 connected to the output of inverter 193 for responding to an all off signal at output 117 of circuit 16, and another input 272 connected to the output of inverter 223 for responding to an all on status at output 116. Either of these inputs holds counter 259 in a clear condition at input 268 thereof until at least one but less than all of the loads are on.

The frequency at which the on-off order at outputs 12 is shifted by rotator circuit 122 may be adjusted for each installation. As an example of a typical load rotation schedule, amplifier network 161, voltage controlled oscillator 162 and counter network 163 may be set to provide the following schedule of rotation: 90% of the loads on will produce a load order rotation every 5 minutes; 50% of the loads on will produce a rotation every 3 minutes; and 10% of the loads on will produce a rotation every 2 minutes.

OUTPUT CIRCUITS

The output of each latch 51–52 is connected to and for controlling an associated relay driver 41 which in turn energizes an associated electromagnetic relay device 40. Drivers 41 may be provided by any suitable, well-known circuit, such as here formed by an inverter 301, transistor 302, diode 303, and LED indicator 304, and resistor 306 for the driver 41 associated with the No. 1 load. LED indicator serves to display the on-off condition of the associated driver and relay.

Alternatively, the output circuits responsive to latches 51–55 may be any suitable switching device or circuit, including wholly solid state switches, for connecting and disconnecting the loads in accordance with the states of latch stages 42.

SUMMARY OF OPERATION

From the foregoing detailed description it will be seen that load control switching circuit 16 and load add/shed and rotation circuit 17 cooperate to individually control the outputs 12 for a predetermined plurality of loads in accordance with a multiplicity of rotatable, switching orders. While circuit 13 determines the total number or collective state, of the loads controlled at outputs 12, controller 11 allocates the on and off load conditions within the limits established by circuit 13.

Although the difference count levels at which loads are added and shed may be adjusted to meet the needs of each installation, an example of a particular add/shed schedule is as follows:

First load shed at a difference count = 40
Last load shed at a difference count = 8
First load added at a difference count = 11
Last load added at a difference count = 43

Usually, it will be desirable to provide a uniform count spacing, such as eight difference counts, between any two adjacent add or any two adjacent shed thresholds. Also it has been found preferable to provide at least 2½ count levels between the add and shed threshold responses of the comparators. In other words, when a load is shed, the difference count must increase at least 2½ counts before the next add threshold is reached.

While only a particular embodiment of the present invention has been disclosed herein, it will be apparent to persons skilled in the art that numerous changes and modifications may be made thereto without departing from the spirit of the invention. For example, while the switching circuit 16 and rotation circuit 17 are here illustrated in combination with a power demand control system, it will be appreciated that other regulating means may be used to generate the difference count produced by circuit 13 and used to generate the add and shed commands. Examples of such other regulating means are set forth hereinabove. In general, controller 11, including switching circuit 13 and rotation circuit 17, may be used in conjunction with any regulating means capable of regulating or determining the collective state of the loads controlled at outputs 12 by generating add and or shed command signals adapted to govern the operation of controller 11. In this regard, the disclosed embodiment of the invention provides for generating add and shed command signals in response to a difference count available from circuit 13. It will be appreciated that an alternative construction and operation may provide for generating the add and shed command signals by applying a control signal from a regulating means connected directly to the comparators 127 and 129, in lieu of the output signal developed by difference amplifier 126.

Still a further alternative embodiment may provide a regulating means that itself generates successive add and or shed pulse signals suitable for direct application to the add and shed inputs 77 and 78 of switching circuit 16 as shown in FIG. 4. In such case, the portion of circuit 17 that generates and directs the add and shed pulse signals from the comparators may be omitted, leaving rotator circuits 121 and 122 effective for rotating the switching states of circuit 16 as the status of the loads controlled at outputs 12 is changed by the directly applied add and shed pulses.

A further alternative embodiment may provide for generating add or shed pulses by the provision of automatically controlled or manually controlled switches connected to the add or shed inputs of network 143. The adding or shedding of loads would thus occur in response to the condition of the input switch or switches, however controlled, rather than in response to the output state of the comparators 127 and 129. For example, on-off switches may be employed at the inputs of network 143 to turn on a plurality of loads controlled at outputs 12 in a staged sequence, to similarly turn the loads off in a staged sequence, and to rotate the switching orders of the loads by circuits 121 and 122 in the manner described above.

Another embodiment may provide for combining the non-priority load rotation of controller 11 with a priority controller, each controller being adapted to operate separate sets of loads. The add and shed command signals from the comparators of circuit 17 would be selectively steered or routed alternately to first one and then the other controller so as to control one set of loads on a rotating non-priority basis, and to control the other set according to a predetermined priority schedule.

While the above disclosed embodiment of the invention provides for the cooperative operation of first off rotator circuit 121 and timed rotator circuit 122, either of these circuits may be used separately, if desired, however the combination of both circuits results in a preferred, more uniform distribution of the load use.

Accordingly, the foregoing disclosure and description thereof are for illustrative purposes only and do not in any way limit the invention which is defined only by the following claims.

We claim:
1. In an electrical system including a load controller having a plurality of load controlling outputs each capable of assuming either a load-on condition or a load-off condition, said outputs being adapted for individually controlling the connections of a corresponding plurality of electrical loads to a power source, and a load regulating means connected to said controller for regulating the collective status of said load-on and load-off conditions at said outputs, said regulating means assuming an add mode when the number of said outputs that are in said load-on condition is to be increased and assuming a shed mode when the number of said outputs that are in said load-on condition is to be decreased, the improvement in said controller comprising:
  switching means connected to said outputs and having input means responsive to said regulating means for successively switching said outputs from said load-off conditions to said load-on conditions when the regulating means is in the add mode and for successively switching said outputs from said load-on conditions to said load-off conditions when said regulating means is in the shed mode, said switching means including means for establishing a plurality of different orders of succession in which said outputs are successively switched;
  rotation circuit means for changing said switching means from one of said orders of succession to another of said orders of succession; and,
  means for sensing a predetermined collective status of said conditions at said outputs, said rotation circuit means being operative in response to said means for sensing so as to change said switching means from one of said orders of succession to another of said orders of succession when said conditions at said outputs assume said predetermined collective status.

2. In the electrical system of claim 1, wherein said rotation circuit means includes a first-off rotator circuit and said predetermined collective status of said conditions is defined by all of said outputs being in said load-on condition, said first-off rotator circuit being connected to said means for sensing and being operative in response thereto for rotating the first one of said outputs to be switched from the load-on condition to the load-off condition each time the regulating means assumes the shed mode following said predetermined collective status in which all of said outputs are in the load-on condition.

3. In the electrical system of claim 1, wherein said switching means includes an add input means and a shed input means, said add input means being responsive to an add signal to cause one of said outputs that is in the load-off condition to assume the load-on condition, said shed input means being responsive to a shed signal to cause one of said outputs that is in the load-on condition to assume the load-off condition, and wherein said controller means includes means for generating said add signal when the load regulating means assumes the add mode and means for generating said shed signal when the load regulating means assumes the shed mode, said add and shed input means together being responsive to generally simultaneous add and shed signals to cause said switching means to change from one of said orders of succession to another of said orders of succession, and said rotation circuit means including means for generating said generally simultaneous add and shed signals when the load regulating means assumes the shed mode and said means for sensing has sensed said predetermined collective status.

4. In an electrical system including a load controller having a plurality of load controlling outputs each capable of assuming either a load-on condition or a load-off condition, said outputs being adapted for individually controlling the connections of a corresponding plurality of electrical loads to a power source, and a load regulating means connected to the controller for regulating the collective status of the load-on and load-off conditions of said outputs by assuming an add mode to increase the number of said outputs that are in the load-on condition and by assuming a shed mode to decrease the number of said outputs that are in the load-on condition, the improvement in said controller comprising:
  switching means connected to said load controlling outputs and having input means responsive to said regulating means for successively switching said outputs from said load-off condition to said load-on condition when the regulating means is in the add mode and for successively switching said outputs from the load-on condition to the load-off condition when the regulating means is in the shed mode;
  means for sensing the number of said outputs that are in the load-on condition; and
  rotation circuit means for rotating the load-on and load-off conditions among said outputs without changing the number of said outputs that are in the load-on condition, said rotation circuit means including timing means repsonsive to said means for effecting such rotation of the load-on and load-off conditions at a frequency that is dependent on the number of said outputs that are in the load-on condition.

5. In the electrical system of claim 4 wherein said means for sensing said number of said outputs that are in the load-on condition includes means for generating a signal that represents said number, and said timing means of said rotation circuit means being responsive to said signal that represents said number to increase said frequency as said number decreases, whereby said frequency varies inversely with the number of loads that are connected to the power source.

6. In the electrical system of claim 5, wherein said switching means includes an add input means and a shed input means, said add input means being responsive to an add signal to cause one of said outputs that is in the load-off condition to assume to the load-on condition, said shed input means being responsive to a shed signal to cause one of said outputs that is in the load-on condition to assume the load-off condition, and wherein said controller means includes means for generating said add signal when the load regulating means assumes the add mode and for generating said shed signal when the load regulating means assumes the shed mode, said add and shed input means together being responsive to generally simultaneous add and shed signals to effect said rotation of the load-on and load-off conditions at said outputs, and said rotation circuit means including means for generating said generally simultaneous add and shed signals.

7. In the electrical system of claim 4, wherein said switching means includes:
   means for establishing a plurality of different orders of succession according to which said outputs are successively switched in response to the regulating means;
   means for sensing a predetermined collective status of the conditions at said outputs; and
   additional rotation circuit means that is operative in response to said means for sensing said predetermined collective status of the conditions at said outputs to change said switching means from one of said orders of succession to another of said orders of succession.

8. In a method of controlling the on-off conditions of a plurality of loads including the step of switching the loads in succession between on and off conditions for regulating the number of loads that are in the on condition in response to a regulating means that assumes an add mode when the number of on loads is to be increased and assumes a shed mode when the number of on loads is to be decreased, the steps in combination therewith comprising:
   switching the loads in succession from their off conditions to their on conditions when the regulating means is in its add mode and switching the loads in succession from their on conditions to their off conditions when the regulating means is in its shed mode, the steps of successively switching the loads being in accordance with one of a plurality of predetermined orders of succession;
   sensing a predetermined collective status of the on and off conditions of said plurality of loads; and
   automatically rotating the order in which said loads are successively switched between the on and off conditions from said one of a plurality of predetermined orders to another of such orders in response to said step of sensing said predetermined collective status.

9. In the method of claim 8, wherein said predetermined collective status is defined by all of said loads being in the on condition, and wherein said step of sensing includes the substep of sensing that one of said loads in said on condition is to be switched to the off condition.

10. In a method of controlling the on-off conditions of a plurality of loads including the step of switching the loads in succession between on and off conditions for regulating the number of loads that are in the on condition, the steps in combination therewith comprising:
   sensing the number of loads that are in the on condition out of said plurality of loads;
   rotating the on and off conditions of said plurality of loads without changing the number of loads that are in the on conditions; and
   varying said time intervals as a function of said step of sensing the number.

11. The method of claim 10, wherein said frequency is varied as an inverse function of said number of loads that are in the on condition.

12. An electrical load control system for controlling the connections of a plurality of loads to a source of electrical power comprising:
   a load regulating means and a load controller means, said load controller means including switching means having input means and having a plurality of outputs, each of said outputs having a load-on condition and a load-off condition for controlling the connection of a separate one of the loads to the source of electrical power, said switching means being operative in response to receipt by said input means of a succession of add signals to successively switch said outputs from said load-off conditions to said load-on conditions, and being operative in responsive to receipt by said input means of a succession of shed signals to successively switch said outputs from said load-on conditions to said load-off conditions;
   said load controller means having a load status signal producing means for producing a load status signal representing the number of said outputs that are in said load-on condition;
   said load regulating means having difference signal producing means for producing a difference signal representing a predetermined difference relationship between a measured rate of power as it is consumed by those loads that are connected to the source of electrical power and a reference rate;
   said load controller means further having means for generating said add and shed signals that includes comparator means for comparing said difference signal with said load status signal, said comparator means causing the generation of at least one of said add signals when said difference signal and said load status signal have a first predetermined relation, and said load status signal changing each time one of the loads is connected in response to such a generated add signal so that said difference signal must also change before said first predetermined relation can again exist, and said comparator means causing the generation of at least one of said shed signals when said difference signal and said load status signal have a second predetermined relation, and said load status signal changing each time one of the loads is disconnected in response to such a generated shed signal so that said difference signal must also change before said second predetermined relation can again exist.

13. The electrical load control system of claim 12, wherein said load regulating means is of the type that regulates the number of connected loads so that the power consumed by the connected loads during a predetermined demand interval is not greater than a predetermined maximum demand limit, said difference signal producing means having means for presetting said difference signal to an initial level representing a predetermined offset difference by which the reference rate is assumed to exceed said measured rate of power at the beginning of said demand interval, said difference signal increasing when said measured rate of power is falling behind said reference rate, and said difference signal decreasing when said measured rate of power is overtaking said reference rate, said load status signal producing means and said comparator means coacting so that said changes in said load status signal require changes of said difference signal to successively higher levels to cause successive production of said add signals, and require changes of said difference signal to successively lower levels to cause successive production of said shed signals.

* * * * *